April 5, 1938. C. R. CLARK 2,113,192
DIRECTION SIGNAL FOR AUTOMOBILES
Filed Aug. 8, 1935 3 Sheets-Sheet 1
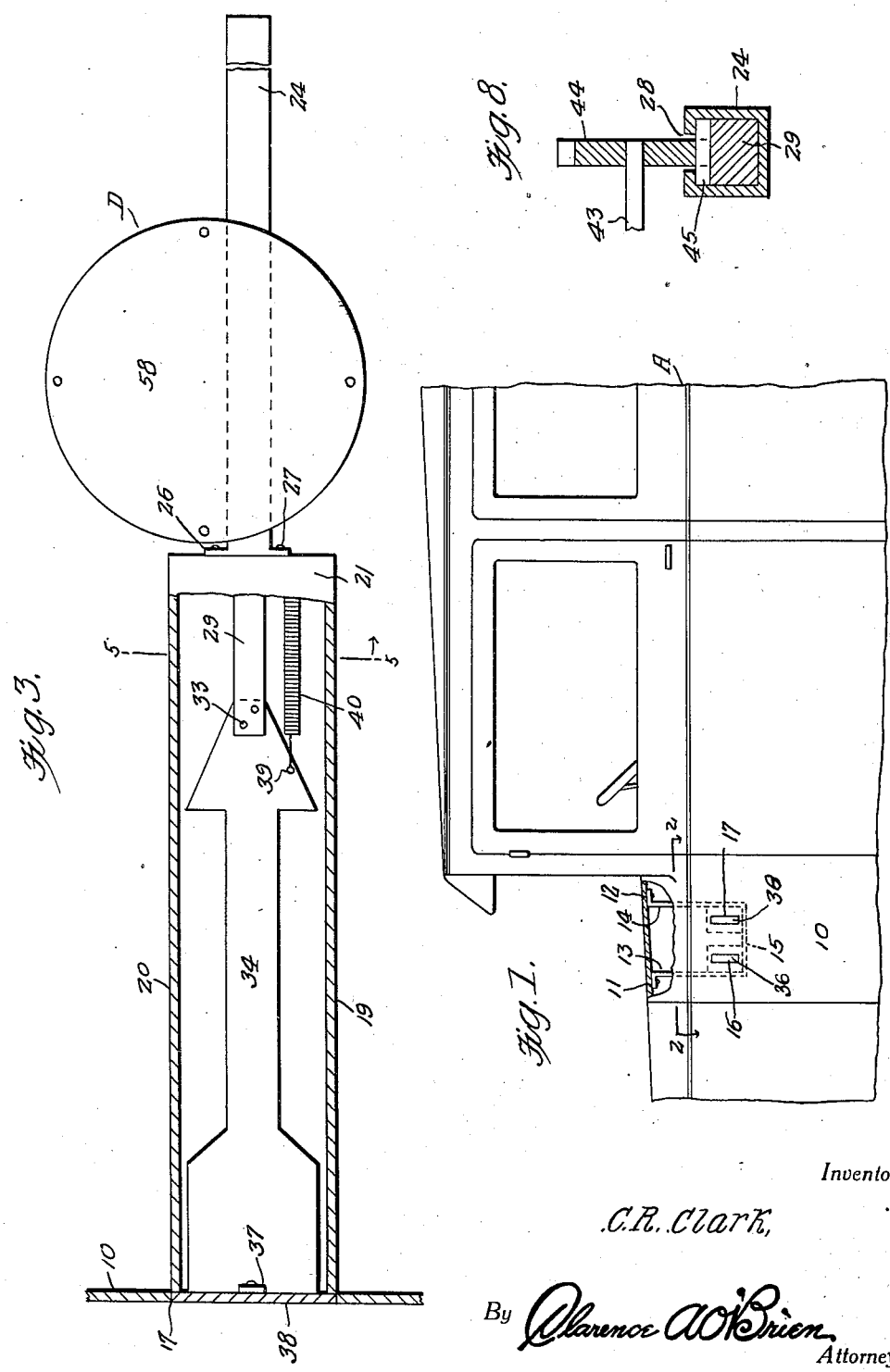
Inventor
C. R. Clark,
By Clarence A. O'Brien
Attorney

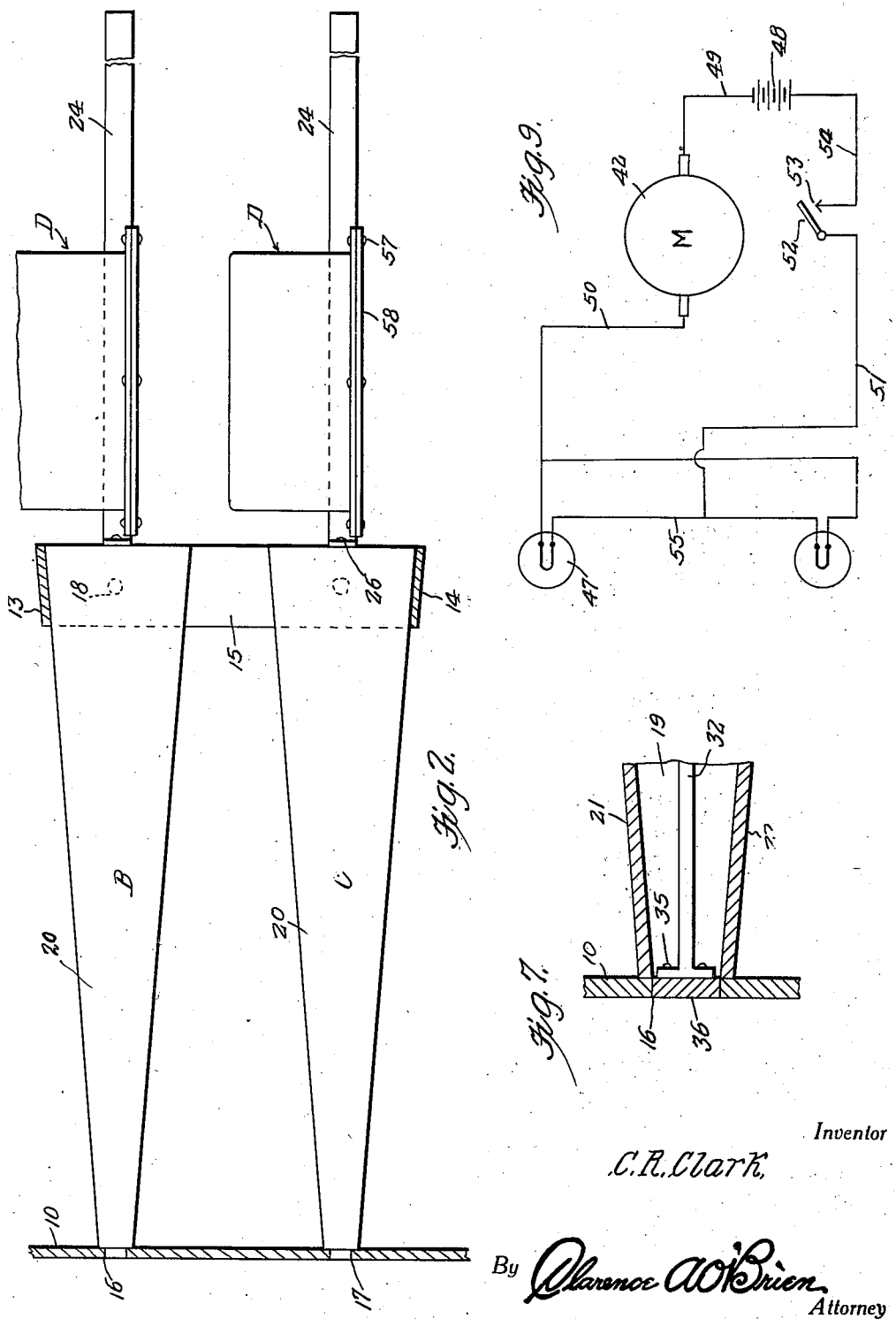

April 5, 1938. C. R. CLARK 2,113,192
DIRECTION SIGNAL FOR AUTOMOBILES
Filed Aug. 8, 1935 3 Sheets-Sheet 3
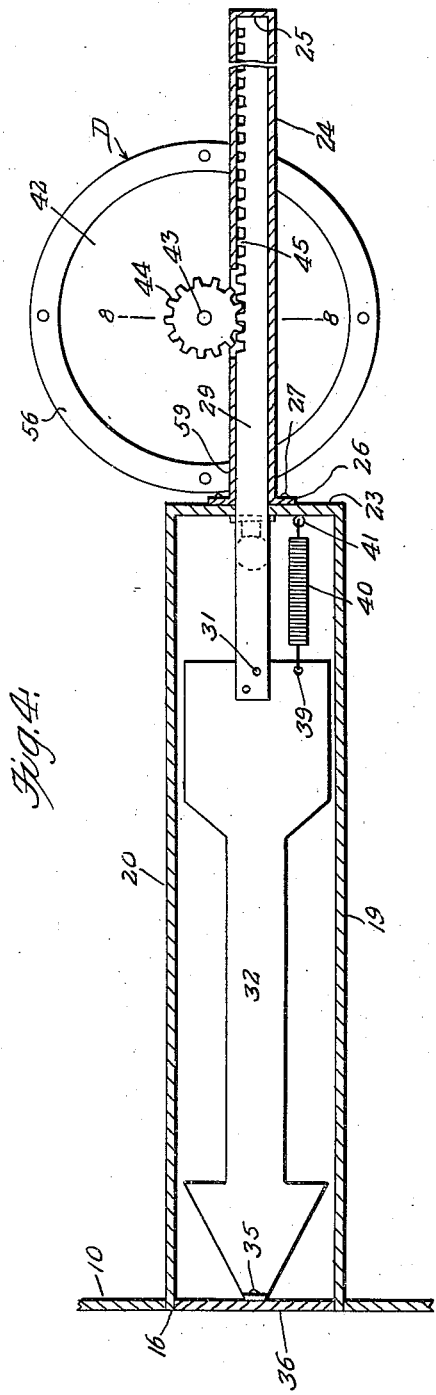
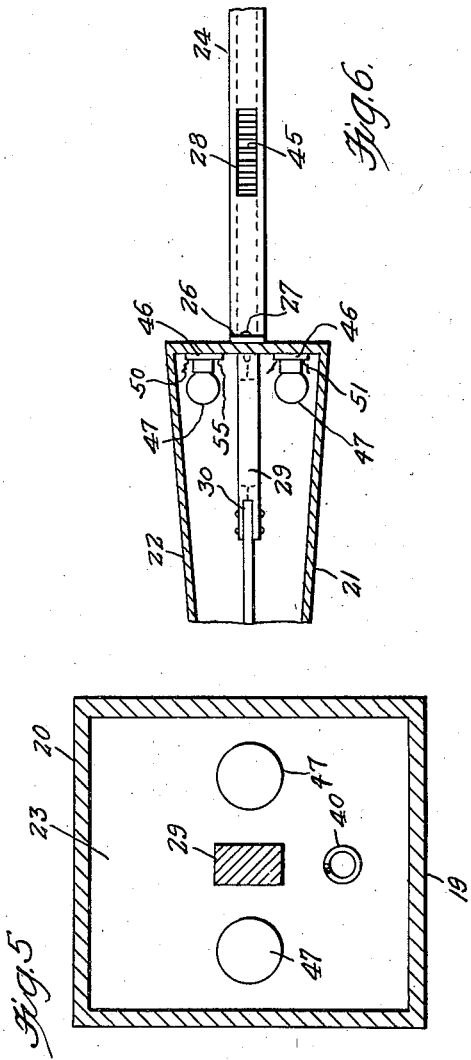
Inventor
C. R. Clark,
By *Clarence A. O'Brien*
Attorney Patented Apr. 5, 1938

2,113,192

UNITED STATES PATENT OFFICE 2,113,192

DIRECTION SIGNAL FOR AUTOMOBILES

Charles R. Clark, St. Joseph, Mo.

Application August 8, 1935, Serial No. 35,378

1 Claim. (Cl. 177—329)

This invention relates to direction signals for automobiles.

One of the objects of the invention is to provide a direction signal that may be mounted in a compact arrangement in the cowl of an automobile in a minimum of space so that by manipulation of a selected switch key one of a pair of signal arms will be projected laterally of the automobile indicating to traffic the driver's intention to make either a right or a left hand turn depending upon which signal arm is selected for operation.

Another feature of the present invention is to provide for illuminating the signal arm simultaneously with the extension thereof so that the attention of traffic will be attracted thereby.

Further objects of the invention are to provide a device of the character referred to that is strong, compact and durable, thoroughly reliable for its intended purpose, very simple to operate and install, and comparatively inexpensive to manufacture.

With the foregoing and other objects in view, the invention consists of a novel construction, combination and arrangement of parts as will be hereinafter more specifically described and illustrated in the accompanying drawings wherein is disclosed an embodiment of the invention, but it is to be understood that changes, variations and modifications may be resorted to without departing from the spirit of the claims hereunto appended.

In the drawings wherein like reference characters denote corresponding parts throughout the several views:

Figure 1 is a fragmentary side elevation of an automobile having parts broken away around the cowl thereof, and showing an adaptation therewith of the device in accordance with the present invention.

Figure 2 is a horizontal section through the cowl of the automobile taken substantially on the plane of line 2—2 of Figure 1 and looking downwardly in the direction of the arrows.

Figure 3 is a fragmentary vertical section through the cowl of the automobile showing the right hand turn indicator in sectional elevation.

Figure 4 is a view similar to Figure 3 showing the left hand turn indicator and having certain parts removed.

Figure 5 is a vertical section taken substantially on line 5—5 of Figure 3 and looking in the direction of the arrows.

Figure 6 is a horizontal section through the casing with the rack bar guide casing attached thereto and the motor housing removed from the guide casing.

Figure 7 is a fragmentary horizontal section through the cowl and casing.

Figure 8 is a vertical section taken substantially on the plane of line 8—8 of Figure 4.

Figure 9 is a diagrammatic view of the electric circuit used for operating and illuminating the direction signals.

Referring to the drawings in detail, A indicates generally an automobile of the closed body type and 10 indicates the cowl portion of the automobile. It is the purpose of the present invention to mount a pair of signal arms in the left hand side of the cowl so that one or the other of the signal arms may be projected laterally from the cowl to indicate to traffic a right or a left hand turn. In carrying out the purpose of the invention there is a substantially U-shaped bracket depending downwardly in a vertical plane having flanges 11, 12 on the ends of the legs 13, 14 respectively secured to the wall of the cowl. This bracket forms a cradle support for the two casings that are secured to the crown portion 15 of the bracket. In the left hand side of the cowl are a pair of spaced rectangular openings out of which are extended the right turn signal arm and the left turn signal arm respectively whichever one is selected by the operator of the automobile.

Within the cowl portion of the automobile are disposed the pair of casings B and C in side by side relation. The axes of the elongated casings are disposed in the same horizontal plane and the rear ends of the casings are bolted to the portion 15 of the bracket as at 18. The top and bottom walls 19, 20 are in horizontal parallelism, while the opposite side walls 21, 22 converge toward the outer end of the casing which is open. Top and bottom wall and the side walls merge with the closed back wall 23. The structure of both casings is the same.

Projecting rearwardly from each casing is a horizontal rack bar guide casing 24 open at its inner end and closed by a back wall 25. The guide casing 24 is substantially rectangular in cross section. On the top and bottom walls at the outer open ends the guide casing 24 is formed with flanges 26 which are bolted to the rear wall 23 of the casing by bolts 27. In the top wall of the rack bar guide casing 24 is an elongated slot 28. The rack bar 29 is slidably supported in the guide casing 24 and in the retracted relation the inner end of the rack bar bears against the rear wall 25 of the guide casing, while the forward end of the rack bar extends through the open inner end of the guide casing through the opening in the rear wall of the casing and terminates within the main casing.

On the end of the rack bars, which extend into the respective main casings, each rack bar is provided with a terminal slot 30. In the slot 30 of one rack bar is bolted as at 31 the tail end of the signal arm 32 which is in the form of an arrow which is disposed in the casing with the edges in a vertical plane. Signal arm 32 pointing toward the left indicates a left hand turn. In the terminal slot 30 of the companion rack bar 29 in the companion casing is bolted as at 33 the pointed end of the signal arm 34 which is also in the shape of an arrow. Signal arm 34 has the point directed inwardly and toward the right so that it will indicate a right hand turn when the signal arm is extended.

When the rack bars are retracted the length of the signal arm is such that it terminates directly at the open end of the respective casings B and C. The pointed end of the left hand turn signal arm is formed with a flange 35 to which is bolted a plate 36 and this plate forms a closure for the opening 16 in the side of the cowl. To the tail end of the other signal arm 34 is bolted as at 37 a plate 38 that forms a closure for the opening 17 in the cowl when the signal arm is retracted.

The tail end of the signal arm 32 and the pointed end of the signal arm 34 are provided with openings 39 to receive the outer end of a horizontally disposed coiled spring 40 there being one spring for each signal arm and one spring in each casing B and C. The inner ends of the respective coil springs 40 are secured to eye bolts 41 secured in the rear walls 23 of each casing. It will thus be seen that when the rack bars 29 are moved outwardly or to the left from Figures 3 and 4 of the drawings that the respective plates 36, 37 will move with the signal arm which latter will be projected by the outward movement of the rack bars. The driver of the automobile may select through different switches which direction signal he wishes to project. After the direction signal has been projected and it has served its purpose to indicate the turn, the springs 40 retract the signal arm back into the casing when the electrical mechanism is de-energized. When the signal arms are retracted into the casings the plates 36, 38 form closures for the openings 16, 17 respectively.

There is a drum-like motor housing indicated generally at D supported on the rack bar guide housing 24 which extends through this motor casing. In each casing is mounted an electric motor 42 and there is a horizontal armature shaft 43 mounted in the casing which carries a spur gear 44. The spur gear is arranged so that the teeth thereof extend through the slot 28 in the guide casing 24 and mesh with the teeth 45 on the upper edge of the rack bar. It will be seen that when the motor 42 is energized the rack bar 29 will be urged to the left as shown in Figures 3 and 4 and when the motor is de-energized the springs 40 will retract the rack bar. Secured to the rear wall 23 of the casings B, C are lamp sockets 46 one on each side of each rack bar and in each lamp socket is mounted an electric light bulb 47.

It will be understood that there is an individual circuit for the right hand turn signal arm and the left hand turn signal arm and there are separate electric motors 42 to operate the signal arms. Referring to the diagrammatic electrical circuit in Figure 9, it will be seen that 48 indicates the battery of an automobile from which leads an electrical conductor wire 49 to one side of the motor 42. From the other side of the motor 42 leads the electrical conductor wire 50 to one lamp 47 which is connected in series with the other lamp 47 and from this other lamp 47 there is an electrical conductor 51 which leads to the switch arm 52. It will be understood that there will be two switch arms 52 on the dashboard or other convenient place within the reach of the driver of the automobile. The one switch 52 for the one circuit will control the extension of the left hand signal arm while the other switch will control the extension of the right hand signal arm. Switch arm 52 makes contact with the terminal 53 which terminal is electrically connected by the conductor 54 to the battery 48. The conductor wire connecting the two lamps of the casing together is indicated at 55.

On one face the drum housing D has a flange 56 over which is bolted as at 57 the cover plate 58 which may be removed for the purposes of repair. The guide housing 24 extends through openings 59 in the opposite rims and flanges of the drum-like motor housing D whereby the motor and motor housing are supported by the guide housing 24. The guide housing 24 extends in a chordwise direction through the housing D.

Having thus described the invention, what is claimed as new is:

In a signal structure, a vehicle body having an opening in the side thereof, a casing having converging side walls defining a narrow end having an opening and a relatively wide end to define a lamp compartment, said narrow end terminating in said body opening, a pointer, means for slidably moving the pointer in the case and through the narrow end of the casing to project beyond the casing to afford a visible signal, and a closure plate secured to one end of the pointer and adapted to close the narrow end of the casing when the pointer is in retracted position.

CHARLES R. CLARK.